(12) United States Patent
Burd

(10) Patent No.: US 9,085,010 B2
(45) Date of Patent: *Jul. 21, 2015

(54) COATING FOR COOLING AIR HOLES

(71) Applicant: United Technologies Corporation, Hartford, CT (US)

(72) Inventor: Steven W. Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,965

(22) Filed: Aug. 11, 2014

(65) Prior Publication Data
US 2014/0349029 A1  Nov. 27, 2014

Related U.S. Application Data

(63) Continuation of application No. 13/487,290, filed on Jun. 4, 2012.

(51) Int. Cl.
*B05D 5/00* (2006.01)
*F01D 5/00* (2006.01)
*F01D 5/18* (2006.01)
*F01D 5/28* (2006.01)

(52) U.S. Cl.
CPC ............... *B05D 5/005* (2013.01); *F01D 5/005* (2013.01); *F01D 5/186* (2013.01); *F01D 5/288* (2013.01); *F05D 2230/80* (2013.01); *F05D 2230/90* (2013.01); *F05D 2250/52* (2013.01)

(58) Field of Classification Search
USPC .............. 427/8, 142, 596; 428/131; 451/5, 39
See application file for complete search history.

(56) References Cited

U.S. PATENT DOCUMENTS

| | | | |
|---|---|---|---|
| 5,392,515 A | 2/1995 | Auxier et al. | |
| 5,851,678 A * | 12/1998 | Hasz et al. | ..................... 428/469 |
| 6,074,706 A | 6/2000 | Beverly et al. | |
| 2004/0134897 A1 | 7/2004 | Das et al. | |
| 2005/0126001 A1 | 6/2005 | Hanley | |
| 2005/0191422 A1 | 9/2005 | Fernihough et al. | |
| 2007/0041838 A1 | 2/2007 | Charbonneau et al. | |
| 2007/0090310 A1 | 4/2007 | Hamilton et al. | |
| 2008/0085395 A1 | 4/2008 | Fernihough et al. | |
| 2009/0270014 A1 | 10/2009 | Miller et al. | |

OTHER PUBLICATIONS

International Search Report and Written Opinion for International Application No. PCT/US2013/042811 completed on Aug. 13, 2013.

* cited by examiner

*Primary Examiner* — Nathan T Leong
(74) *Attorney, Agent, or Firm* — Carlson, Gaskey & Olds, P.C.

(57) ABSTRACT

A method of repairing a component removes a prior coating from an underlying metal substrate. Small cooling air holes extend through the substrate and the coating that is to be removed. A new coating layer is placed on the metal substrate, and over the existing cooling air holes. The location of the cooling air holes is identified by inspecting the coated component for the location of indicators of the coating passing over the cooling air holes. The identified location of the indicators is used to control a cutting tool to remove any new coating from the cooling air holes. The basic method may also benefit new manufacture.

18 Claims, 2 Drawing Sheets

COATING FOR COOLING AIR HOLES

CROSS-REFERENCE TO RELATED APPLICATION

This application is a continuation of U.S. patent application Ser. No. 13/487,290, filed Jun. 4, 2012.

BACKGROUND

This application relates to a method of repairing a coating on a component having small cooling air holes.

Gas turbine engines are known, and typically include a compressor delivering air into a combustion section where it is mixed with fuel and ignited. Products of this combustion pass downstream over turbine rotors, driving them to rotate. The turbine rotors typically include rotor drums carrying a plurality of blades. The blades are subjected to a great deal of heat, and thus air-cooling techniques have been developed for the turbine blades. In addition, there are typically static vanes positioned intermediate rows of the blades, and the static vanes are also provided with air-cooling techniques.

Other locations within a gas turbine engine also experience challenges from heat. As an example, structure in the combustion section may require air-cooling. In addition, components downstream of the turbine sections may also experience very high temperatures, and may be provided with air-cooling.

One standard air-cooling technique is a provision of a plurality of very small holes to direct cooling air from an internal cavity in the component to the outer surface of the component. Other ways of providing air to the holes would include supplying air from a plenum, or a pressurized air stream.

In addition, the components are typically provided with various coatings to assist in surviving the extreme challenges of the turbine environment. One such coating is a thermal barrier coating. The thermal barrier coatings have sometimes become distressed, such as experiencing spallation or liberation. The components are then typically recoated.

SUMMARY

A method of repairing a component according to an example of the present disclosure includes the steps of a) removing a prior coating from an underlying metal substrate, there being small cooling air holes extending through the substrate and the coating that is to be removed; b) placing a new coating on the substrate, and over cooling air holes; c) identifying the location of the cooling air holes by inspecting the coated component for the location of indicators of the coating passing over the cooling air holes, the identification step being performed by one of laser scanning and part probing; d) using the identified location of the indicators to control a cutting tool to remove coating from the cooling air holes, the removal step being performed by one of a laser drilling and electro-discharge machining; and e) placing a top coating outwardly of the new coating prior to step c), the new coating including a first material and the top coat including a second material different from the first material, wherein the step of identifying the location of the cooling air holes is based on a formation of the top coat on the new coating.

In a further embodiment of any of the foregoing embodiments, laser scanning is utilized to identify the location of the indicators.

In a further embodiment of any of the foregoing embodiments, part probing is utilized to identify the location of the indicators.

In a further embodiment of any of the foregoing embodiments, the coating is removed from the cooling air holes in step d) using laser drilling.

In a further embodiment of any of the foregoing embodiments, the coating is removed from the cooling air holes in step d) using electro-discharge machining.

In a further embodiment of any of the foregoing embodiments, the coating includes a bond layer directly deposited on the substrate and an outer coating deposited on the bond layer in step b).

In a further embodiment of any of the foregoing embodiments, the outer coating is a thermal barrier coating.

In a further embodiment of any of the foregoing embodiments, the component is a gas turbine engine component having an airfoil, and internal air-cooling supply cavities to deliver air to the cooling air holes.

In a further embodiment of any of the foregoing embodiments, the top coat is boron nitride.

A method of coating a component according to an example of the present disclosure includes the steps of a) placing a coating on a metal substrate, and over cooling air holes formed through the metal substrate; b) identifying the location of the cooling air holes by inspecting the coated component for the location of indicators of the coating passing over the cooling air holes, the identification step being performed by one of laser scanning and part probing; and c) using the identified location of the indicators to control a cutting tool to remove coating from the cooling air holes, the removal step being performed by one of a laser drilling and electro-discharge machining; and d) placing a top coating outwardly of the new coating prior to step c), the coating including a first material and the top coat including a second material different from the first material.

In a further embodiment of any of the foregoing embodiments, the coating includes a bond layer directly deposited on the substrate and an outer coating deposited on the bond layer in step b).

In a further embodiment of any of the foregoing embodiments, the component is a gas turbine engine component having an airfoil, and internal air-cooling supply cavities to deliver air to the cooling air holes.

A further embodiment of any of the foregoing embodiments includes identifying the location of the cooling air holes in response to detecting the top coat.

A method of repairing a component according to an example of the present disclosure includes the steps of: a) removing a prior coating from an underlying metal substrate, there being small cooling air holes extending through the substrate and the coating that is to be removed; b) placing a new coating on the substrate, and over cooling air holes; c) identifying the location of the cooling air holes by inspecting the coated component for the location of indicators of the coating passing over the cooling air holes, the identification step being performed by a vision system; and d) using the identified location of the indicators to control a cutting tool to remove coating from the cooling air holes, the removal step being performed by one of a laser drilling and electro-discharge machining, the vision system and the cutting tool being separate and distinct.

In a further embodiment of any of the foregoing embodiments, the vision system is operable to perform one of white light inspection and blue light inspection to determine a geometry of each of the cooling air holes.

A further embodiment of any of the foregoing embodiments includes the step of comparing the location of indicators in step c) to a known location of the cooling air holes being formed initially in the substrate.

A further embodiment of any of the foregoing embodiments includes the step of disposing a top coat outwardly of the new coating prior to step c), the new coating including a first material and the top coat including a second material different from the first material, wherein the step of identifying the location of the cooling air holes is based on a formation of the top coat on the new coating.

A further embodiment of any of the foregoing embodiments includes the step of detecting a top coat disposed on the new coating, the new coating including a first material and the top coat including a second material different from the first material.

A further embodiment of any of the foregoing embodiments includes the step of detecting a top coat disposed on the new coating, the new coating including a first material and the top coat including a second material different from the first material.

In a further embodiment of any of the foregoing embodiments, the coating is removed from the cooling air holes in step d) using electro-discharge machining.

These and other features of this application will be best understood from the following specification and drawings, the following of which is a brief description.

DETAILED DESCRIPTION

Figure 1:
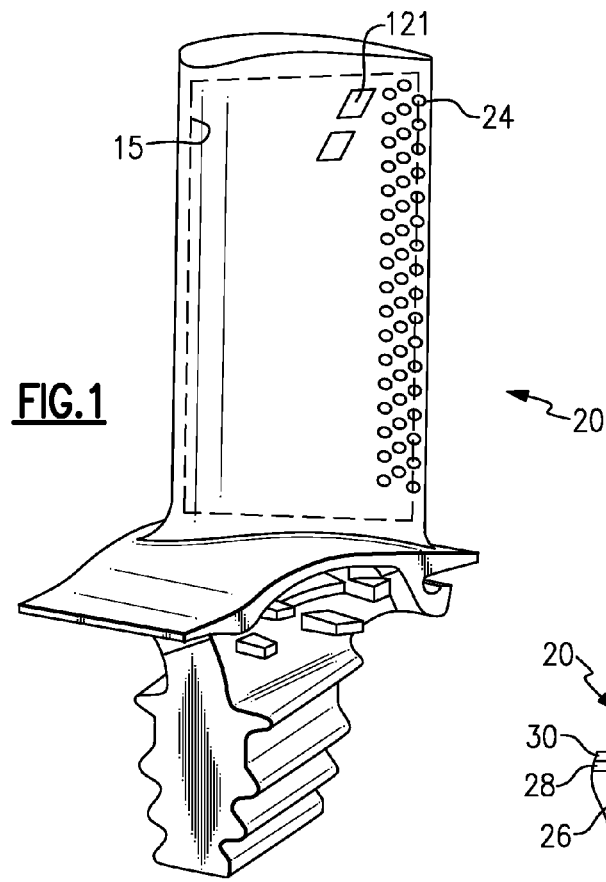
FIG. 1 shows a gas turbine engine component.

FIG. 1 shows a component 20 which may typically be a gas turbine engine turbine blade or vane. The component has a coating, as known, and the coating has been distressed as shown schematically at 121. This may be the coating breaking away from the surface of the component 20, and may be a problem known as spallation or liberation. The coating may be a thermal barrier coating which is typically used to assist the component in surviving in the extreme temperatures faced during normal operation. However, other type coatings may benefit from the teaching of this application.

A plurality of cooling air holes 24 are shown in the component 20. As known, the component 20 has internal cavities, shown in phantom at 15. Those cavities receive air, as known, and may deliver the air outwardly to a skin of the component through the cooling air holes 24.

Figure 2A:
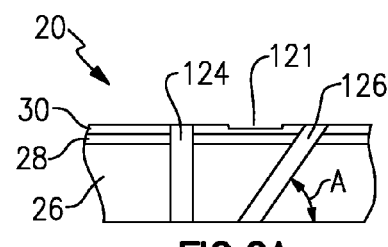
FIG. 2A shows a damaged coating on a component.

FIG. 2A shows a first step in repairing the coating on the component 20. As shown, the component 20 has a base metal 26, an outer bond layer 28 on the base metal, and the coating layer 30. The coating layer 30 may be a thermal barrier coating. As shown, cooling air holes 124 and 126 extend through both coating layers 28 and 30. For original equipment manufacture, the cooling air holes 124 and 126 may be cut through the coating layers 28 and 30, and the body 26 at the same time. As shown, there is a distressed area 121 which is requiring the component be recoated.

Holes used for this sort of function may be on the order of 0.020-0.050 inch (0.050-0.127 cm). Holes such as hole 124, may be drilled normal to the surface, and may be angled in a range of 20-45 degrees.

Figure 2B:
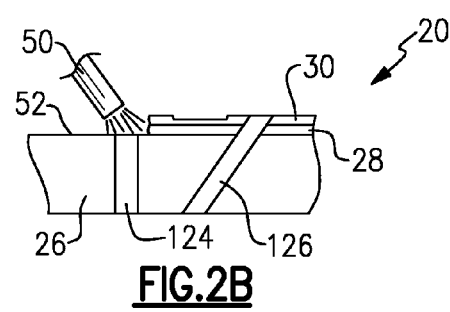
FIG. 2B shows a first step in repairing the component.

Thus, as shown in FIG. 2B, a cleaning instrument, such as a water jet tool, shown schematically at 50, removes the coating layers 28 and 30. As shown, there is a "cleaned" area 52. Once the component has its entire coating 28 and 30 removed, subsequent bond coating 54 and a subsequent coating, such as the thermal barrier coating 56, are deposited on the metal body 26.

Figure 2C:
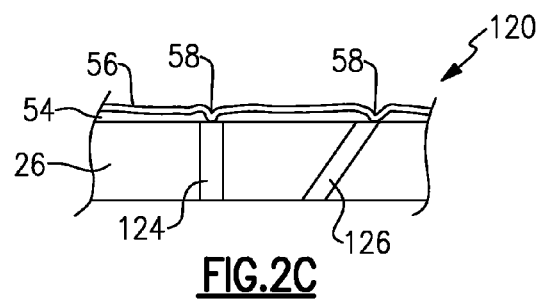
FIG. 2C shows a subsequent step.

As can be appreciated from FIG. 2C, there will be dimples 58 associated with the coatings aligned with the openings 124 and 126 in the recoated component 120. These dimples provide an indication of the location of the underlying holes, but require removal before the component can be returned to operation.

The indicator, or dimples, may be generally volcano-shaped depressions in the coating. On the other hand, it is also possible that there will be a hole extending through the coating. That is, there may actually be a hole extending somewhat through the coating, however, there would still be coating in the complete cooling air hole that should be removed. These features are also indicators of the presence of an underlying hole.

Figure 3:
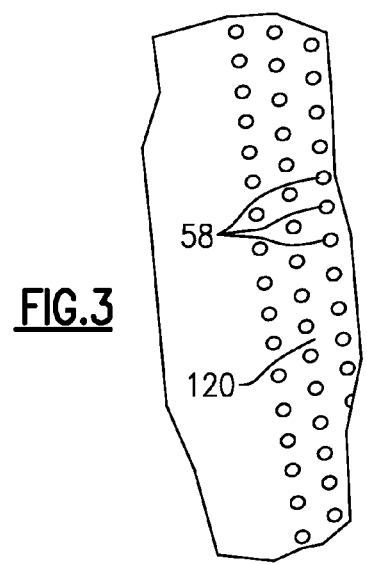
FIG. 3 shows an intermediate product, consistent with the FIG. 2C step.

FIG. 3 shows these dimples or other indicators 58 on the side of a component 120.

Figure 4A:
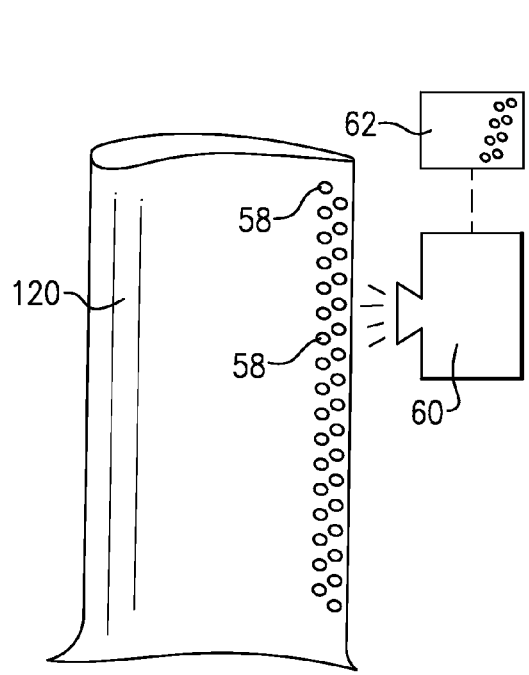
FIG. 4A shows a subsequent step.

FIG. 4A shows the component 120 after the depositing of the coating as shown in FIG. 2C. As shown, there are a plurality of dimples or indicators 58 associated with the cooling air holes.

Some visual inspection technique will be utilized to determine the location of these dimples, or other indicators, of an underlying hole underneath the coating layers. This is shown as a visual camera 60 communicating with an appropriate electronic machine such as a computer 62. A map of the location of the dimples 58 is captured and stored in the computer 62. White light inspection, blue light inspection or other vision systems, laser scanning or simple or complex part probing may be utilized to capture the location of the dimples 58.

Figure 4B:
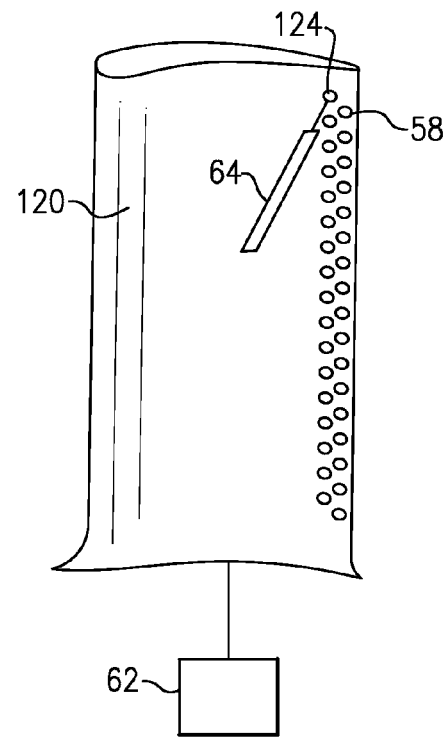
FIG. 4B shows a final step.

Once the location of the dimples is found, the holes are recut through the new coating as shown in FIG. 4B. A cutting tool, such as a water jet or laser 64 communicates with the computer 62 and utilizes the previously identified location of the indicators to control where to clean the holes as shown at 124. In addition, the newly captured location of the dimples may be utilized in combination with the known location where the holes were believed to have been formed initially.

The term "tool" is broadly intended in this application. As an example, the water jet or laser 64 would be a "tool." Other tools may include mechanical means, including grinding or drilling. Also, abrasive techniques could be utilized, such as grit or sandblasting. Finally, electro-discharge machining is an option. All of these would come under the broad term "tool" as would other methods of removing the material.

By utilizing the inspection technique, the present invention is able to accurately drill the holes, without drilling at a location not including any hole, which would potentially ruin the new coating. In fact, the new holes need not be perfectly aligned with the original holes, but the method captures the majority of the original hole locations.

A top coat, such as boron nitride, or other thin coating, may be applied outwardly of the recoated component 120 to assist with the hole formation, and the optical inspection technique.

While the disclosed methods have primary application as repair techniques, there may be benefits for utilizing the inspection techniques for forming holes through a coating in a new manufacture.

A worker of ordinary skill in this art would recognize that certain modifications would come within the scope of this invention. For that reason, the following claims should be studied to determine the true scope and content of this invention.

The invention claimed is:

1. A method of repairing a component comprising the steps of:
   a) removing a prior coating from an underlying metal substrate, there being small cooling air holes extending through said substrate and said prior coating that is to be removed;
   b) placing a new coating on the substrate, and over cooling air holes, said new coating including a bond layer directly deposited on the substrate and an outer coating deposited on the bond layer;
   c) identifying the location of the cooling air holes by inspecting the coated component for the location of indicators of the new coating passing over the cooling air holes, the identification step being performed by one of laser scanning and part probing;
   d) using the identified location of the indicators to control a cutting tool to remove coating from the cooling air holes, the removal step being performed by one of laser drilling and electro-discharge machining; and
   e) placing a top coat outwardly of the new coating prior to step c), the new coating including a first material and the top coat including a second material different from the first material, wherein the step of identifying the location of the cooling air holes is based on a formation of the top coat on said new coating; wherein the top coat is boron nitride.

2. The method as set forth in claim 1, wherein laser scanning is utilized to identify the location of the indicators.

3. The method as set forth in claim 1, wherein part probing is utilized to identify the location of the indicators.

4. The method as set forth in claim 1, wherein the coating is removed from the cooling air holes in step d) using laser drilling.

5. The method as set forth in claim 1, wherein the coating is removed from the cooling air holes in step d) using electro-discharge machining.

6. The method as set forth in claim 1, wherein said outer coating is a thermal barrier coating.

7. The method as set forth in claim 1, wherein said component is a gas turbine engine component having an airfoil, and internal air-cooling supply cavities to deliver air to the cooling air holes.

8. The method as set forth in claim 1, wherein the step of identifying the location of the cooling air holes is in response to detecting the top coat.

9. A method of coating a component comprising the steps of:
   a) placing a coating on a metal substrate, and over cooling air holes formed through said metal substrate;
   b) identifying the location of the cooling air holes by inspecting the coated component for the location of indicators of the coating passing over the cooling air holes, the identification step being performed by one of laser scanning and part probing;
   c) using the identified location of the indicators to control a cutting tool to remove coating from the cooling air holes, the removal step being performed by one of laser drilling and electro-discharge machining; and
   d) placing a top coat outwardly of the coating prior to step c), the coating including a first material and the top coat including a second material different from the first material, wherein the step of identifying the location of the cooling air holes is based on a formation of the top coat on the coating, and the coating includes a bond layer directly deposited on the substrate and an outer coating deposited on the bond layer in step b), wherein the top coat is boron nitride.

10. The method as set forth in claim 9, wherein said component is a gas turbine engine component having an airfoil, and internal air-cooling supply cavities to deliver air to the cooling air holes.

11. The method as set forth in claim 9, comprising identifying the location of the cooling air holes in response to detecting the top coat.

12. The method as set forth in claim 9, wherein the outer coating is a thermal barrier coating.

13. A method of repairing a component comprising the steps of:
   a) removing a prior coating from an underlying metal substrate, there being small cooling air holes extending through said substrate and said coating that is to be removed;
   b) placing a new coating on the substrate, and over cooling air holes;
   c) identifying the location of the cooling air holes by inspecting the coated component for the location of indicators of the coating passing over the cooling air holes, the identification step being performed by a vision system;
   d) using the identified location of the indicators to control a cutting tool to remove coating from the cooling air holes, the removal step being performed by one of laser drilling and electro-discharge machining, the vision system and the cutting tool being separate and distinct; and
   c) disposing a top coat outwardly of said new coating prior to step c), the new coating including a first material and the top coat including a second material different from the first material, wherein the step of identifying the location of the cooling air holes is based on a formation of the top coat on the new coating, and the new coating includes a bond layer directly deposited on the substrate and an outer coating deposited on the bond layer, wherein the top coat is boron nitride.

14. The method as set forth in claim 13, wherein said vision system is operable to perform one of white light inspection and blue light inspection to determine a geometry of each of the cooling air holes.

15. The method as set forth in claim 13, comprising the step of comparing the location of indicators in step c) to a known location of the cooling air holes being formed initially in the substrate.

16. The method as set forth in claim 13, comprising the step of detecting the top coat disposed on the new coating.

17. The method as set forth in claim 13, wherein the coating is removed from the cooling air holes in step d) using electro-discharge machining.

18. The method as set forth in claim 13, wherein the step of identifying the location of the cooling air holes is in response to detecting the top coat and the outer coating is a thermal barrier coating.

* * * * *